US012198625B2

(12) United States Patent
Lee et al.

(10) Patent No.: US 12,198,625 B2
(45) Date of Patent: Jan. 14, 2025

(54) DISPLAY DEVICE AND METHOD OF DRIVING THE SAME

(71) Applicant: Samsung Display Co., Ltd., Yongin-Si (KR)

(72) Inventors: Sang Hyun Lee, Yongin-si (KR); Dae Sik Lee, Yongin-si (KR); Keun Oh Kang, Yongin-si (KR); Si Duk Sung, Yongin-si (KR); Song Yi Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/137,485

(22) Filed: Apr. 21, 2023

(65) Prior Publication Data

US 2024/0046868 A1 Feb. 8, 2024

(30) Foreign Application Priority Data

Aug. 5, 2022 (KR) ........................ 10-2022-0098197

(51) Int. Cl.
*G09G 3/3233* (2016.01)

(52) U.S. Cl.
CPC ....... *G09G 3/3233* (2013.01); *G09G 2310/08* (2013.01); *G09G 2330/021* (2013.01); *G09G 2330/028* (2013.01); *G09G 2330/04* (2013.01)

(58) Field of Classification Search
CPC ............. G09G 3/3233; G09G 2310/08; G09G 2330/021; G09G 2330/028; G09G 2330/04; G09G 2300/0819; G09G 2320/045; G09G 2330/025; G09G 3/3208; G09G 2370/00
See application file for complete search history.

(56) References Cited

U.S. PATENT DOCUMENTS

| | | | | |
|---|---|---|---|---|
| 9,449,552 B2 | | 9/2016 | Lee et al. | |
| 2010/0253706 A1* | | 10/2010 | Shirouzu | G09G 3/2092 345/76 |
| 2014/0176524 A1* | | 6/2014 | Lee | G09G 3/3233 345/212 |
| 2016/0125800 A1* | | 5/2016 | Kim | G09G 3/2003 345/212 |
| 2017/0031485 A1* | | 2/2017 | Kim | G06F 3/04184 |
| 2021/0233471 A1* | | 7/2021 | Takazane | G09G 3/3233 |

FOREIGN PATENT DOCUMENTS

| | | |
|---|---|---|
| KR | 10-2117341 B1 | 6/2020 |
| KR | 10-2434376 B1 | 8/2022 |

* cited by examiner

*Primary Examiner* — Mihir K Rayan
(74) *Attorney, Agent, or Firm* — Innovation Counsel LLP

(57) ABSTRACT

The present inventive concept provides a display device including a pixel unit which includes pixels, a sensing unit connected to the pixels through sensing lines, a first power voltage generator connected to the pixels through a first power line and generating a first power voltage for driving the pixels, a second power voltage generator connected to the pixels through the first power line and generating a second power voltage for sensing the pixels, and a timing controller selectively controlling operations of the first power voltage generator and the second power voltage generator according to a driving method of the pixel unit, and a method driving the same.

20 Claims, 7 Drawing Sheets

DISPLAY DEVICE AND METHOD OF DRIVING THE SAME

CROSS-REFERENCE TO RELATED APPLICATION

The application claims priority to and the benefit of Korean Patent Application No. 10-2022-0098197 filed in the Korean Intellectual Property Office on Aug. 5, 2022, the entire contents of which are incorporated herein by reference.

BACKGROUND

1. Technical Field

The technical field relates to a display device and a method of driving the same.

2. Related Art

As information technology has been developed, a display device that is a communication medium between a user and information has become increasingly popular. As such, a display device, such as a liquid crystal display device or an organic light-emitting display device, is widely used.

A display device displays an image using a plurality of pixels. The plurality of pixels may receive a driving current from a commonly connected power source. In this case, when a current path of some pixels is in a short-circuited state, an overcurrent may flow from the power source thereby causing a burnt phenomenon.

Meanwhile, each of the plurality of pixels includes a driving transistor. In this case, a process variation, degradation, and the like may cause an electrical characteristic deviation between the driving transistors of the pixels, and thus it may be difficult to implement a desired gray scale. In order to solve such a problem, an external compensation method of compensating for the electrical characteristic deviation between the driving transistors outside the pixel is used.

In addition, the display device includes a direct current converter (DC-DC converter) which converts input power supplied from the outside to generate a voltage required to drive the pixels. In this case, the voltage output from the DC-DC converter includes a ripple voltage due to switching which may degrade the stability and quality of the external compensation method.

SUMMARY

An embodiment of the present inventive concept provides a display device capable of improving the stability and quality of an external compensation method and suppressing a burnt phenomenon, and a method of driving the same.

However, the objects of the present inventive concept are not limited to the above-described objects and may be variously expanded without departing from the spirit and scope of the present inventive concept.

A display device according to an embodiment of the present inventive concept includes a pixel unit including pixels, a sensing unit connected to the pixels through sensing lines, a first power voltage generator connected to the pixels through a first power line and generating a first power voltage for driving the pixels, a second power voltage generator connected to the pixels through the first power line and generating a second power voltage for sensing the pixels, and a timing controller selectively controlling operations of the first power voltage generator and the second power voltage generator according to a driving method of the pixel unit.

In one embodiment, when the pixel unit is driven in a display mode, the timing controller may supply a first control signal to the first power voltage generator, and the first power voltage generator may supply the first power voltage to the first power line in response to the first control signal.

In one embodiment, wherein, when the pixel unit is driven in a sensing mode, the timing controller may supply a second control signal to the second power voltage generator, and the second power voltage generator may supply the second power voltage to the first power line in response to the second control signal.

In one embodiment, the second power voltage generator may further include an overcurrent protection circuit operated in the sensing mode, and the overcurrent protection circuit may include a current detector detecting a driving current flowing through a driving transistor included in each of the pixels to generate a driving current value, and a current limiter limiting the driving current to the current limit value during a current limit period when the driving current value is greater than or equal to a current limit value.

In one embodiment, after the current limit period, the current limiter may supply an off signal to the timing controller, the timing controller may supply a third control signal to each of the first power voltage generator and the second power voltage generator in response to the off signal, and each of the first power voltage generator and the second power voltage generator may be turned off in response to the third control signal.

In one embodiment, the current limit period may correspond to a period for sensing a threshold voltage of the driving transistor and/or a period for sensing mobility of the driving transistor.

In one embodiment, the overcurrent protection circuit may further include a filter unit stopping an operation of the current limiter when the driving current spikes.

In one embodiment, the timing controller may control the second power voltage, the current limit value, and/or the current limit period using inter integrated circuit ($I^2C$) communication.

In one embodiment, a magnitude of a ripple voltage included in the second power voltage may be less than a magnitude of a ripple voltage included in the first power voltage.

In one embodiment, the display device may further include an input voltage generator supplying an input voltage to the first power voltage generator, and the first power voltage generator may convert the input voltage to supply the first power voltage.

In one embodiment, the first power voltage may be the same as or similar to an input voltage.

A method of driving a display device including a pixel unit which includes pixels according to an embodiment of the present inventive concept includes generating a first power voltage for driving each of the pixels, generating a second power voltage for sensing each of the pixels, and selectively supplying the first power voltage and the second power voltage to a first power line connected to the pixels according to a driving method of the pixel unit.

In one embodiment, the method may further include, when the pixel unit is driven in a display mode, supplying the first power voltage to the first power line.

In one embodiment, the method may further include, when the pixel unit is driven in a sensing mode, supplying the second power voltage to the first power line.

In one embodiment, the method may further include detecting a driving current flowing in a driving transistor included in each of the pixels, and when the driving current is greater than or equal to a current limit value, limiting the driving current to the current limit value during a current limit period.

In one embodiment, the method may further include stopping supply of the first power voltage and the second power voltage after the current limit period.

In one embodiment, the current limit period may correspond to a period for sensing a threshold voltage of the driving transistor and/or a period for sensing mobility of the driving transistor.

In one embodiment, the method may further include, when the driving current spikes, stopping the limiting of the driving current to the current limit value.

In one embodiment, the second power voltage, the current limit value, and/or the current limit period may be controlled through inter integrated circuit ($I^2C$) communication.

In one embodiment, a magnitude of a ripple voltage included in the second power voltage may be less than a magnitude of a ripple voltage included in the first power voltage.

DETAILED DESCRIPTION OF THE EMBODIMENTS

While the present inventive concept is open to various modifications and alternative embodiments, specific embodiments thereof will be described and illustrated by way of example in the accompanying drawings. However, this is not purported to limit the present inventive concept to a specific disclosed form, but it shall be understood to include all modifications, equivalents and substitutes within the idea and the technological scope of the present inventive concept.

Like numbers refer to like elements throughout the description of the drawings. In the accompanying drawings, the dimensions of structures may be exaggerated to clarify the described technology. While terms such as "first," "second," and the like may be used to describe various components, such components must not be understood as being limited to the above terms. These terms are only used for the purpose of distinguishing one element from another element. For example, without departing from the scope of the present inventive concept, a first component may be referred to as a second component, and likewise a second component may be referred to as a first component. A singular expression includes a plural expression unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

In the specification, when an element is referred to as being "connected" or "coupled" to another element, it can be directly connected or coupled to the another element or be indirectly connected or coupled to the another element with one or more intervening elements interposed therebetween.

Hereinafter, embodiments of the present inventive concept will be described in more detail with reference to the accompanying drawings.

Figure 1:
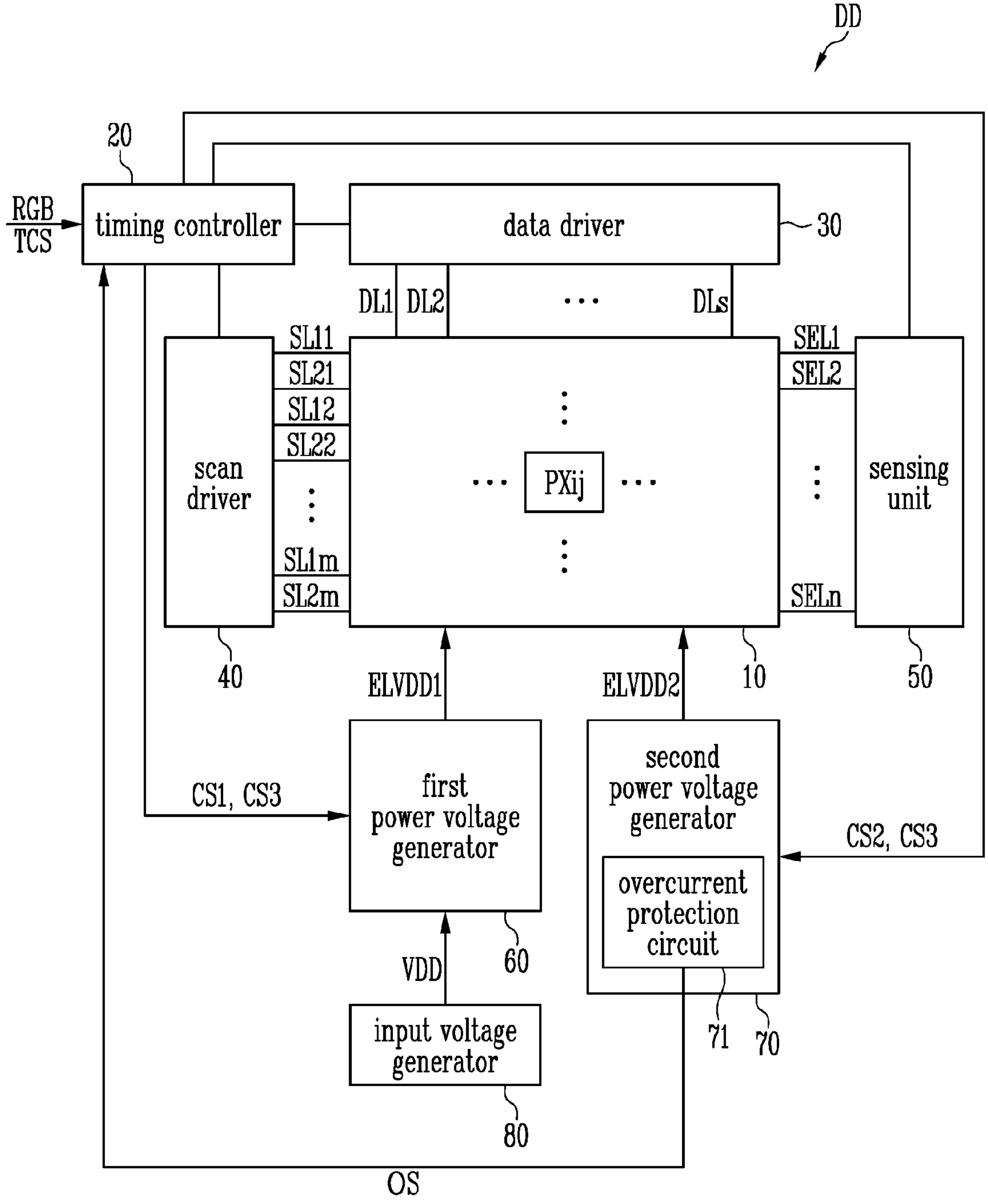
FIG. 1 is a diagram for describing a display device according to one embodiment of the present inventive concept.
Figure 2:
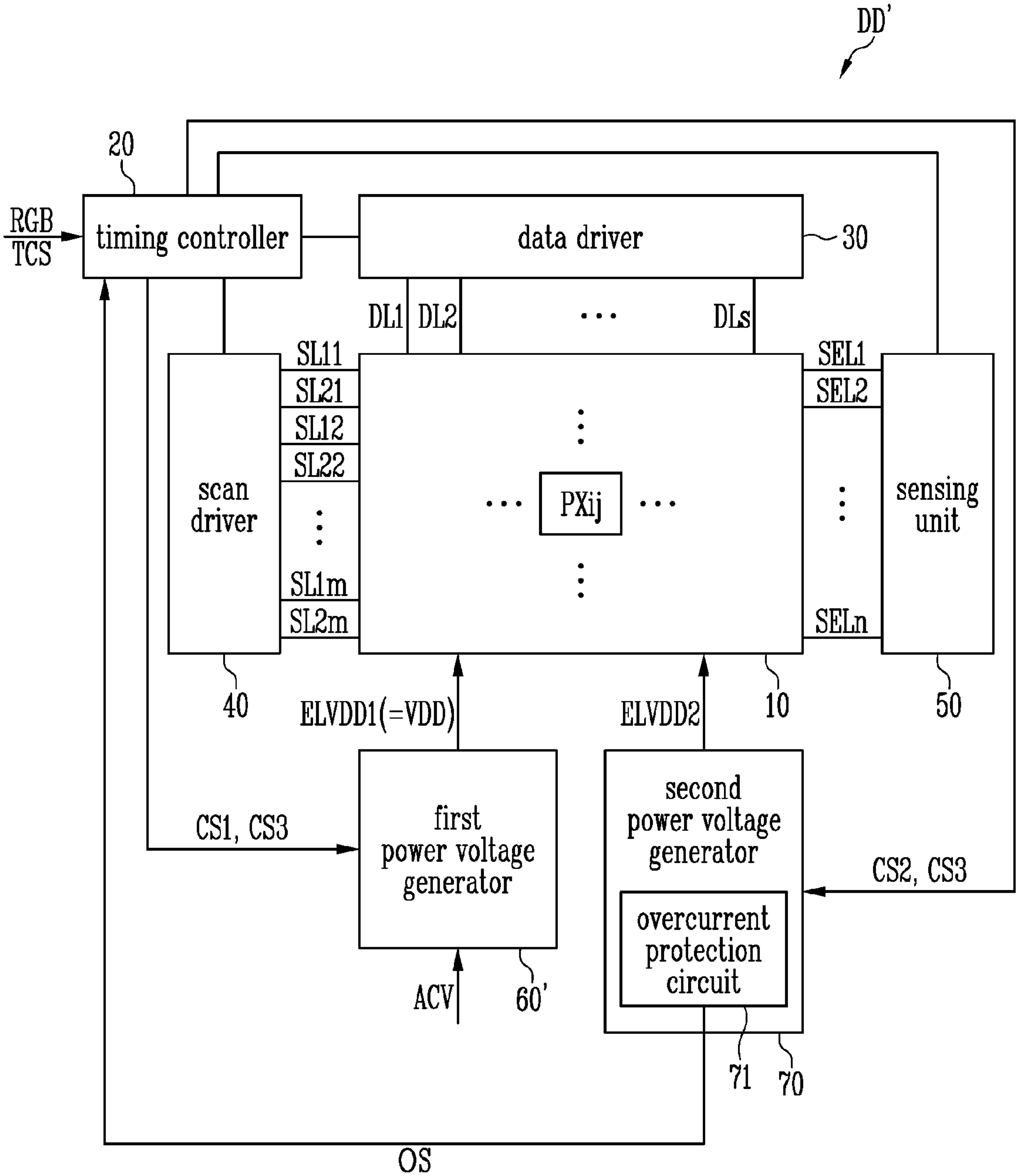
FIG. 2 is a diagram for describing a display device according to another embodiment of the present inventive concept.
Figure 4A:
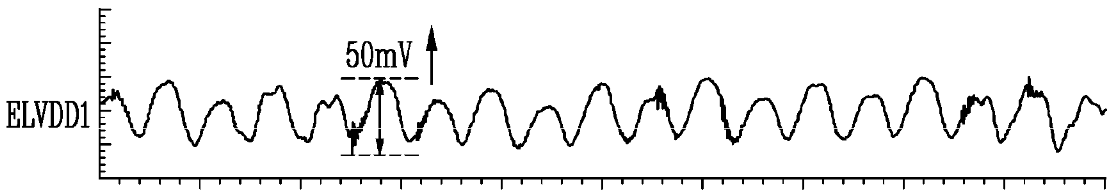
FIG. 4A and FIG. 4B shows diagrams for describing a ripple voltage according to a type of a power voltage.
Figure 4B:
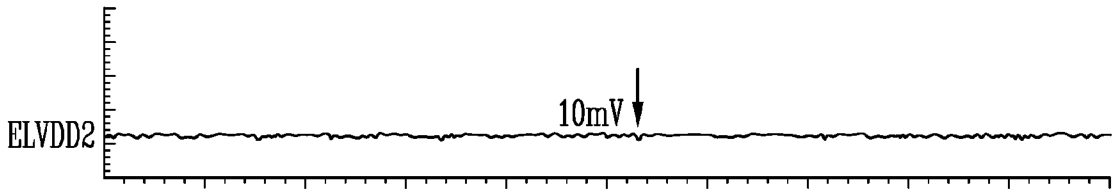

FIG. 1 is a diagram for describing a display device according to one embodiment of the present inventive concept. FIG. 2 is a diagram for describing a display device according to another embodiment of the present inventive concept. FIG. 4A and FIG. 4B show diagrams for describing a ripple voltage according to a type of a power voltage.

Referring to FIG. 1, a display device DD may include a pixel unit 10, a timing controller 20, a data driver 30, a scan driver 40, a sensing unit 50, a first power voltage generator 60, a second power voltage generator 70, and an input voltage generator 80.

Referring to FIG. 2, a display device DD' may include a pixel unit 10, a timing controller 20, a data driver 30, a scan driver 40, a sensing unit 50, a first power voltage generator 60', and a second power voltage generator 70.

The pixel unit 10 may be an area in which an image is displayed. The pixel unit 10 may include pixels connected to scan lines SL11 to SL1m and SL21 to SL2m, data lines DL1 to DLs, sensing lines SEL1 to SELn, and power lines (for example, a first power line PL1 and a second power line PL2 of FIG. 3) (wherein m, n, and s are integers greater than 1). Each pixel PXij may refer to a pixel in which a scan transistor is connected to an $i^{th}$ scan line and a $j^{th}$ data line.

The pixel unit 10 may be driven in a display mode for displaying an input image or a sensing mode for detecting electrical characteristics of the pixel PXij.

For example, when the pixel unit 10 is driven in the display mode, a first power voltage ELVDD1 generated from the first power voltage generator 60 may be supplied to the first power line PL1 connected to each pixel PXij. Accordingly, each pixel PXij may emit light with luminance corresponding to a driving current I_ELVDD1 (shown in FIG. 5) generated based on the first power voltage ELVDD1.

On the other hand, when the pixel unit 10 is driven in the sensing mode, a second power voltage ELVDD2 generated from the second power voltage generator 70 may be supplied to the first power line PL1 connected to each pixel PXij. Accordingly, a driving current I_ELVDD2 (shown in FIG. 5) generated based on the second power voltage ELVDD2 may flow in a driving transistor included in each pixel PXij.

Although not shown, the display devices DD and DD' may further include an emission driver. The emission driver may receive a clock signal, an emission stop signal, and the like from the timing controller 20 to generate emission signals to be provided to emission lines. For example, the emission driver may include light-emitting stages connected to the emission lines. The light-emitting stages may be provided in the form of a shift register. For example, a first light-emitting stage generates an emission signal having a turn-off level based on an emission stop signal having a turn-off level, and the remaining light-emitting stages may sequentially generate emission signals having a turn-off level based on an emission signal having a turn-off level of a previous light-emitting stage.

When the display devices DD and DD' include the above-described emission driver, each pixel PXij further includes a transistor connected to the emission line. Such a transistor may be turned off during a data writing period of each pixel PXij to prevent the pixel PXij from emitting light. Hereinafter, descriptions will be made on the assumption that the emission driver is not provided.

The timing controller 20 may receive input gray scales RGB and timing control signals TCS from a host system (for example, an application processor (AP)) through an interface. The timing control signals TCS may include a vertical synchronization signal Vsync, a horizontal synchronization signal Hsync, a data enable signal DE, and the like. The timing controller 20 may convert the input gray scales RGB into output gray scales and provide the output gray scales to the data driver 30.

Based on the timing control signals TCS, the timing controller 20 may supply control signals according to specifications of the data driver 30, the scan driver 40, the sensing unit 50, the first power voltage generator 60, and the second power voltage generator 70, respectively.

The timing controller 20 may selectively control the operations of the first power voltage generator 60 and the second power voltage generator 70 according to a driving method of the pixel unit 10.

For example, when the pixel unit 10 is driven in the display mode, the timing controller 20 may supply a first control signal CS1 having a turn-on level (for example, a high level) to the first power voltage generator 60 to turn the first power voltage generator 60 on. At the same time, the timing controller 20 may supply a second control signal CS2 having a turn-off level (for example, a low level) to the second power voltage generator 70 to turn the second power voltage generator 70 off.

On the other hand, when the pixel unit 10 is driven in the sensing mode, the timing controller 20 may supply the second control signal CS2 having a turn-on level (for example, a high level) to the second power voltage generator 70 to turn the second power voltage generator 70 on. At the same time, the timing controller 20 may supply the first control signal CS1 having a turn-off level (for example, a low level) to the first power voltage generator 60 to turn the first power voltage generator 60 off.

The timing controller 20 may supply a third control signal CS3 to each of the first power voltage generator 60 and the second power voltage generator 70 in response to an off signal OS supplied from an overcurrent protection circuit 71. For example, in response to the off signal OS supplied from the overcurrent protection circuit 71, the timing controller 20 may supply the third control signal CS3 having a turn-off level (for example, a low level) to each of the first power voltage generator 60 and the second power voltage generator 70 to simultaneously turn the first power voltage generator 60 and the second power voltage generator 70 off.

The timing controller 20 may use inter integrated circuit ($I^2C$) communication to control the second power voltage ELVDD2 generated by the second power voltage generator 70, a current limit value CLV (shown in FIG. 7) set in the overcurrent protection circuit 71, and/or a current limit period CLP (shown in FIG. 7) set in the overcurrent protection circuit 71. That is, the timing controller 20 may alter the second power voltage ELVDD2, the current limit value CLV, and/or the current limit period CLP according to a specification of the display device.

The timing controller 20 may include a compensator (not shown) for compensating for electrical characteristics (for example, a threshold voltage Vth and/or mobility μ) of the driving transistor based on sensing data supplied from the sensing unit 50.

The data driver 30 may generate data voltages to be supplied to the data lines DL1 to DLs based on the output gray scales and the control signal supplied from the timing controller 20. For example, the data driver 30 may sample the output gray scales using a clock signal and may supply the data voltages corresponding to the output gray scales to the data lines DL1 to DLs in a unit of a pixel row. A pixel row may refer to pixels connected to the same scan line.

The scan driver 40 may receive a clock signal, a scan start signal, and the like from the timing controller 20 to generate scan signals to be supplied to the scan lines SL1 to SL1m and SL21 to SL2m.

The scan driver 40 may sequentially supply scan signals having a turn-on level pulse to the scan lines SL1 to SL1m and SL21 to SL2m. The scan driver 40 may include scan stages provided in the form of a shift register. The scan driver 40 may generate scan signals by sequentially transmitting scan start signals in the form of a turn-on level pulse to subsequent scan stages according to the control of the clock signal.

The scan lines SL1 to SL1m and SL21 to SL2m are illustrated in FIGS. 1 and 2 as being connected to one scan driver 40, but the present inventive concept is not limited thereto. For example, each of the scan lines SL11 to SL1m and SL21 to SL2m may be connected to a scan driver formed as a separate module.

The sensing unit 50 may detect electrical characteristics of the driving transistor included in at least one pixel PXij in the sensing mode. For example, in the sensing mode, the sensing unit 50 may sense a voltage or a current on the sensing line SELn connected to the at least one pixel PXij and may perform analog-digital conversion on a sensing value to generate sensing data. The sensing data may include electrical characteristics (for example, the threshold voltage Vth and/or mobility μ) of the driving transistor. The sensing unit 50 may supply the sensing data to the timing controller 20.

The first power voltage generator 60 may be connected to the pixels PXij through the first power line PL1 (shown in FIG. 3) and may generate the first power voltage ELVDD1 for driving the pixels PXij.

Referring to FIG. 1, the first power voltage generator 60 may convert an input voltage VDD supplied from the input voltage generator 80 to generate the first power voltage ELVDD1. For example, the first power voltage generator 60 may be provided as a DC-DC converter which converts a source of direct current (DC) from one voltage level to another and may step down the input voltage VDD supplied from the input voltage generator 80 to generate the first power voltage ELVDD1. The first power voltage generator 60 may supply the first power voltage ELVDD1 to the pixel unit 10.

Referring to FIG. 2, the first power voltage generator 60' may generate the first power voltage ELVDD1 that is the same as or similar to the input voltage VDD. For example, the first power voltage generator 60' may be an AC-DC converter which converts an alternating current input voltage to a direct current output voltage and may generate the first power voltage ELVDD1 by converting an AC voltage ACV supplied from the outside into a DC voltage that is the same as or similar to the input voltage VDD.

Meanwhile, in a process in which the first power voltage generator 60 or 60' performs DC-DC conversion on the input voltage VDD or performs AC-DC conversion on the AC voltage ACV to generate the first power voltage ELVDD1, a ripple phenomenon may occur due to a remained AC voltage characteristic when performing AC-DC conversion and a switching noise of a transistor. Accordingly, a ripple voltage corresponding to noise may be included in the first power voltage ELVDD1, and a magnitude of the ripple voltage may be 50 mV or more (see FIG. 4A). When the first power voltage ELVDD1 is supplied to the pixel unit 10 in the sensing mode, a compensation deviation according to a coupling between the first power line PL1 and the sensing lines SEL1 to SELn and/or the data lines DL1 to DLs may occur, and thus an artifact phenomenon in which a horizontal line is visible may appear.

Accordingly, when the pixel unit 10 is in the sensing mode, the first power voltage generators 60 and 60" may be turned off in response to the first control signal CS1 having a turn-off level (for example, a low level) supplied from the timing controller 20. That is, when the pixel unit 10 is in the sensing mode, the first power voltage generators 60 and 60' may not supply the first power voltage ELVDD1 to the pixel unit 10. On the other hand, when the pixel unit 10 is in the display mode, the first power voltage generators 60 and 60' may supply the first power voltage ELVDD1 to the pixel unit 10 in response to the first control signal CS1 having a turn-on level (for example, a high level) supplied from the timing controller 20.

The second power voltage generator 70 may be connected to the pixels PXij through the first power line PL1 (shown in FIG. 3) and may generate the second power voltage ELVDD2 for sensing the pixels PXij. For example, the second power voltage generator 70 may be provided as a low drop output (LDO) regulator and may convert an input voltage (not shown) supplied from the outside to generate the second power voltage ELVDD2. The second power voltage generator 70 may supply the second power voltage ELVDD2 to the pixel unit 10. The second power voltage ELVDD2 may be controlled by the timing controller 20 using $I^2C$ communication.

A magnitude of a ripple voltage included in the second power voltage ELVDD2 may be less than the magnitude of the ripple voltage included in the first power voltage ELVDD1. This is because a voltage drop generated in a process in which the second power voltage generator 70 generates the second power voltage ELVDD2 is less than a voltage drop generated in a process in which the first power voltage generator 60 generates the first power voltage ELVDD1. In other words, a voltage difference between an input signal and an output signal may be smaller in the second power voltage generator 70.

For example, the magnitude of the ripple voltage included in the second power voltage ELVDD2 may be less than or equal to 10 mV which is less than the magnitude (50 mV or more) of the ripple voltage included in the first power voltage ELVDD1 (see FIG. 4B). Thus, even when the second power voltage ELVDD2 is supplied to the pixel unit 10 in the sensing mode, a compensation deviation according to a coupling between the first power line PL1 and the sensing lines SEL1 to SELn and/or the data lines DL1 to DLs may be insignificant, and thus a horizontal line may not be visible.

A voltage level of the first power voltage ELVDD1 supplied to the pixel unit 10 in the display mode and a voltage level of the second power voltage ELVDD2 supplied to the pixel unit 10 in the sensing mode may each be changed according to the specification of the display device. That is, the first power voltage ELVDD1 may be set to a voltage level suitable for displaying an image in consideration of the specification of the display device, and the second power voltage ELVDD2 may be set to a voltage level suitable for sensing electrical characteristics of the driving transistor in consideration of the specification of the display device. Accordingly, the voltage level of the first power voltage ELVDD1 may be the same as or different from the voltage level of the second power voltage ELVDD2.

The second power voltage generator 70 may include the overcurrent protection circuit 71 operated in the sensing mode.

The overcurrent protection circuit 71 suppresses or prevents an overcurrent flowing in the pixel unit 10 during a sensing period in which the pixel unit 10 is operated in the sensing mode, thereby reducing the occurrence of burnt due to the overcurrent. For example, when a driving current I_ELVDD flowing in the driving transistor included in each pixel PXij is detected, and the detected driving current I_ELVDD reaches the current limit value CLV, the overcurrent protection circuit 71 may limit the driving current I_ELVDD to the current limit value CLV.

The input voltage generator 80 may generate the input voltage VDD to supply the input voltage VDD to the first power voltage generator 60. For example, the input voltage generator 80 may be implemented as a set integrated circuit (IC) and may generate the input voltage VDD through a main power management circuit (MPMC) included therein to supply the input voltage VDD to the first power voltage generator 60.

Figure 3:
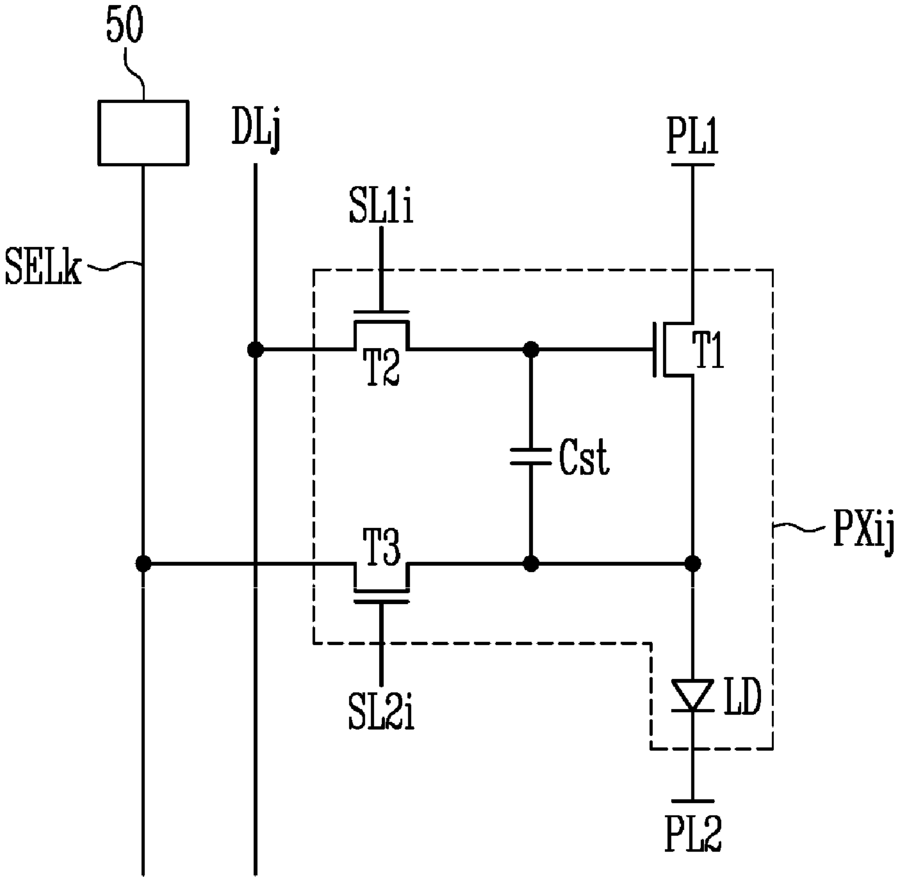
FIG. 3 is a view for describing a pixel according to one embodiment of the present inventive concept.

FIG. 3 is a view for describing a pixel according to one embodiment of the present inventive concept.

Referring to FIG. 3, a pixel PXij may include transistors T1, T2, and T3, a storage capacitor Cst, and a light-emitting diode LD.

Hereinafter, a circuit including an N-type transistor will be described as an example. However, those skilled in the art will be able to design a circuit including a P-type transistor by changing a polarity of a voltage applied to a gate terminal. Similarly, those skilled in the art will be able to design a circuit including a combination of a P-type transistor and an N-type transistor. A P-type transistor refers to a transistor in which an amount of a conducted current increases when a voltage difference between a gate electrode and a source electrode increases in a negative direction. An N-type transistor refers to a transistor in which an amount of a conducted current increases when a voltage difference between a gate electrode and a source electrode increases in a positive direction. The transistors may be provided as various types such as a thin film transistor (TFT), a field effect transistor (FET), a bipolar junction transistor (BJT), and the like.

In a first transistor T1, a gate electrode may be connected to a first electrode of the storage capacitor Cst, a first electrode may be connected to a first power line PL1, and a second electrode may be connected to a second electrode of the storage capacitor Cst. The first transistor T1 may be referred to as a driving transistor.

In a second transistor T2, a gate electrode may be connected to a first scan line SL1i, a first electrode may be connected to a data line DLj, and a second electrode may be connected to the gate electrode of the first transistor T1. The second transistor T2 may be referred to as a scan transistor.

In a third transistor T3, a gate electrode may be connected to a second scan line SL2i, a first electrode may be connected to a sensing line SELk, and a second electrode may be connected to the second electrode of the storage capacitor Cst. The third transistor T3 may be referred to as a sensing transistor.

In the storage capacitor Cst, the first electrode may be connected to the gate electrode of the first transistor T1, and the second electrode may be connected to the second electrode of the first transistor T1.

In the light-emitting diode LD, an anode may be connected to the second electrode of the first transistor T1 and a cathode may be connected to a second power line PL2. The light-emitting diode LD may be provided as an organic light-emitting diode, an inorganic light-emitting diode, a quantum dot/well light-emitting diode, or the like. Meanwhile, although the pixel PXij of FIG. 3 is exemplarily illustrated as including one light-emitting diode LD, in another embodiment, the pixel PXij may include a plurality of light-emitting diodes connected in series, parallel, or series-parallel.

A high potential power voltage ELVDD may be applied to the first power line PL1, and a low potential power voltage ELVSS may be applied to the second power line PL2. The high potential power voltage ELVDD may include a first power voltage ELVDD1 supplied from a first power voltage generator 60 or 60' in a display mode and a second power voltage ELVDD2 supplied from a second power voltage generator 70 in a sensing mode. For example, the first power voltage ELVDD1 may be applied to the first power line PL1 during an image display period, and the second power voltage ELVDD2 may be applied to the first power line PL1 during a sensing period.

In the display mode, when a scan signal having a turn-on level (for example, a high level) is applied to the gate electrode of the second transistor T2 through the first scan line SL1i, the second transistor T2 is turned on. In this case, a data voltage corresponding to an input image supplied from the data line DLj is stored in the storage capacitor Cst. The data voltage of the input image may be a voltage corresponding to input gray scales RGB supplied in the display mode. A positive driving current I_ELVDD1 having an amount corresponding to a voltage difference between the first electrode and the second electrode of the storage capacitor Cst flows between the first electrode and the second electrode of the first transistor T1. Accordingly, the light-emitting diode LD emits light with luminance corresponding to the data voltage of the input image.

Next, when a scan signal having a turn-off level (for example, a low level) is applied through the first scan line Sl1i, the second transistor T2 is turned off, and the data line DLj and the first electrode of the storage capacitor Cst are electrically disconnected. Accordingly, even when a data voltage of the data line DLj is changed, a voltage stored in the storage capacitor Cst is not changed. Meanwhile, even when the second transistor T2 is turned off, the positive driving current I_ELVDD1 may be supplied to the light-emitting diode LD by the data voltage stored in the storage capacitor Cst during one frame period. In the sensing mode, when a scan signal having a turn-on level (for example, a high level) is applied through the second scan line SL2i, the third transistor T3 is turned on. In this case, a reference voltage supplied from the sensing line SELk may be applied to the second electrode of the first transistor T1. The reference voltage may be a voltage having a level at which the first transistor T1s is turned on but the light-emitting diode LD does not emit light.

Subsequently, when a scan signal having a turn-on level (for example, a high level) is applied through the first scan line SL1i, the second transistor T2 is turned on. In this case, a sensing data voltage supplied from the data line DLj is stored in the storage capacitor Cst. The sensing data voltage may be a certain voltage set irrespective of the input gray scales RGB in the sensing mode and may be a voltage having a level capable of turning the driving transistor on. A positive driving current I_ELVDD2 having an amount corresponding to a voltage difference between the first electrode and the second electrode of the storage capacitor Cst flows between the first electrode and the second electrode of the first transistor T1. Accordingly, a sensing unit 50 may sense the driving current I_ELVDD2 flowing through the sensing line SELk or a voltage of the second electrode of the first transistor T1 and may perform analog-digital conversion on a sensing value to generate sensing data.

Next, when a scan signal having a turn-off level (for example, a low level) is applied through the first scan line SL1i and the second scan line S12i, the second transistor T2 and the third transistor T3 are turned off, and the data line DLj and the first electrode of the storage capacitor Cst are electrically disconnected. Accordingly, even when a data voltage of the data line DLj is changed, a voltage stored in the first electrode of the storage capacitor Cst is not changed.

Embodiments may be applied not only to the pixel PXij of FIG. 3 but also to pixels of other pixel circuits. For example, when display devices DD and DD' further include an emission driver, the pixel PXij may further include a transistor connected to an emission line.

Figure 5:
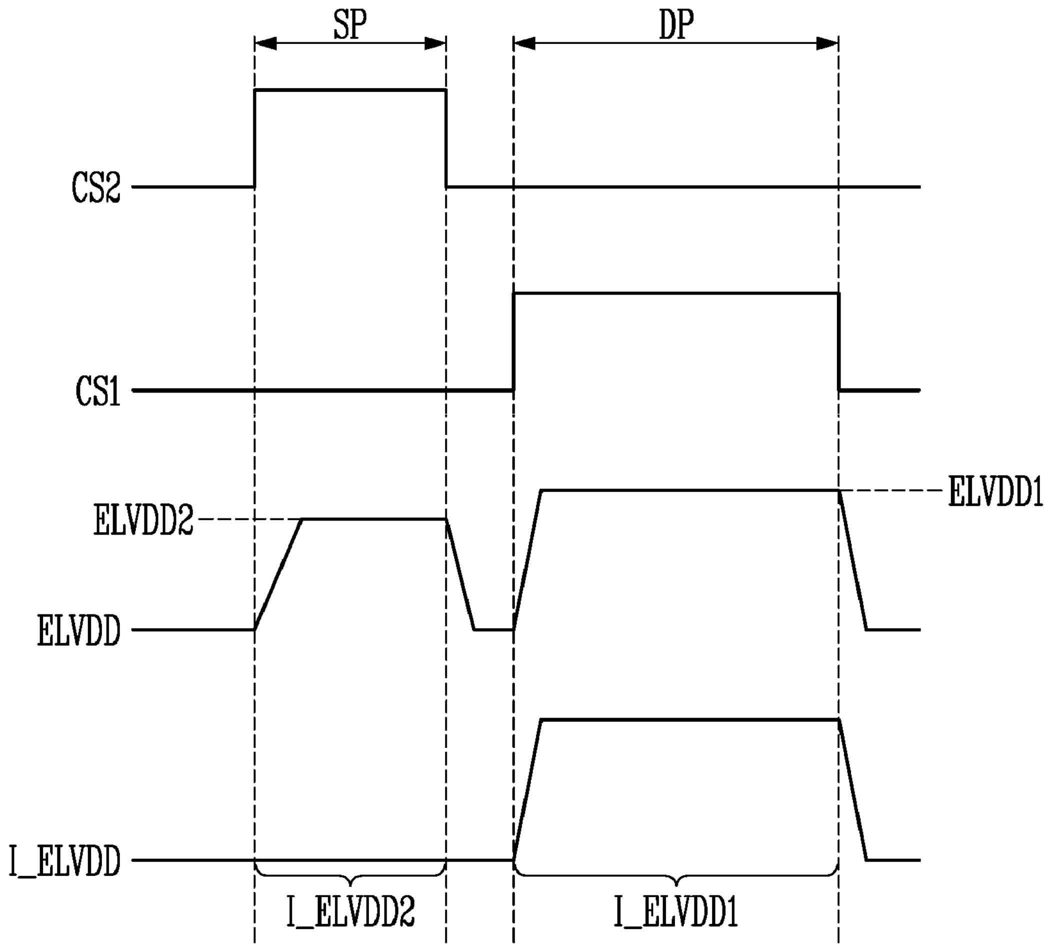
FIG. 5 is a diagram for describing a high potential power voltage and a driving current according to an operation of a timing controller according to one embodiment of the present inventive concept.

FIG. 5 is a diagram for describing a high potential power voltage and a driving current according to an operation of a timing controller according to one embodiment of the present inventive concept.

Referring to FIGS. 1, 2, and 5, during a sensing period SP in which a pixel unit 10 is driven in a sensing mode, a timing controller 20 may supply a second control signal CS2 having a turn-on level (for example, a high level) to a second power voltage generator 70 and may supply a first control signal CS1 having a turn-off level (for example, a low level) to first power voltage generators 60 and 60'. The second power voltage generator 70 may supply a second power voltage ELVDD2 to the pixel unit 10 in response to the second control signal CS2, and the first power voltage generator 60 may be turned off in response to the first control signal CS1.

Accordingly, during the sensing period SP, a high potential power voltage ELVDD may be gradually increased and maintained as the second power voltage ELVDD2. During the sensing period SP, a driving current I_ELVDD may be a driving current I_ELVDD2 flowing in a driving transistor based on the second power voltage ELVDD2. During the sensing period SP, a sensing data voltage may be set to a minimum level capable of turning the driving transistor on, and thus the driving current I_ELVDD2 may maintain a level close to zero.

Next, during a display period DP in which the pixel unit 10 is driven in a display mode, the timing controller 20 may supply the first control signal CS1 having a turn-on level (for example, a high level) to the first power voltage generators 60 and 60' and may supply the second control signal CS2 having a turn-off level (for example, a low level) to the second power voltage generator 70. The first power voltage generators 60 and 60' may supply the first power voltage ELVDD1 to the pixel unit 10 in response to the first control signal CS1, and the second power voltage generator 70 may be turned off in response to the second control signal CS2.

Accordingly, during the display period DP, the high potential power voltage ELVDD may be gradually increased and maintained as the first power voltage ELVDD1. Meanwhile, during the display period DP, the driving current I_ELVDD may be a driving current I_ELVDD1 flowing in a driving transistor based on the first power voltage ELVDD1. During the display period DP, the driving current I_ELVDD1 may rise to a level corresponding to a data voltage of an input image.

Figure 6:
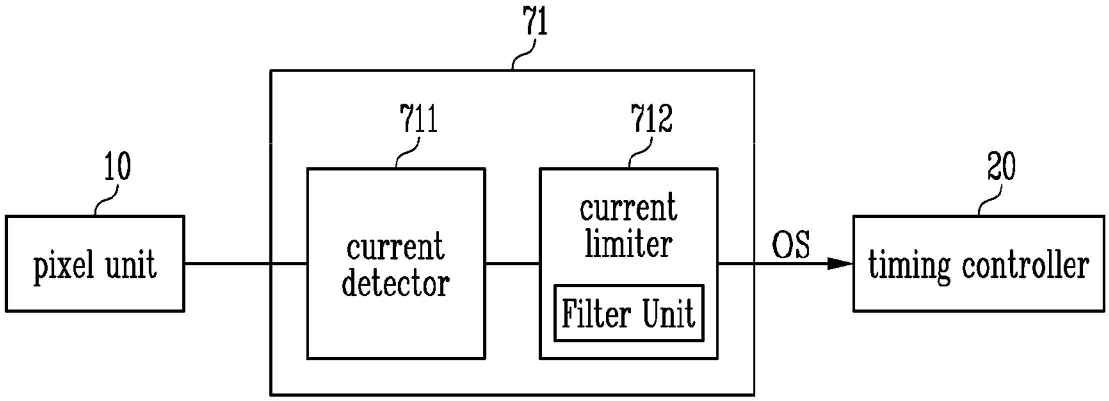
FIG. 6 is a diagram for describing an overcurrent protection circuit according to one embodiment of the present inventive concept.

FIG. 6 is a diagram for describing an overcurrent protection circuit according to one embodiment of the present inventive concept.

Figure 7:
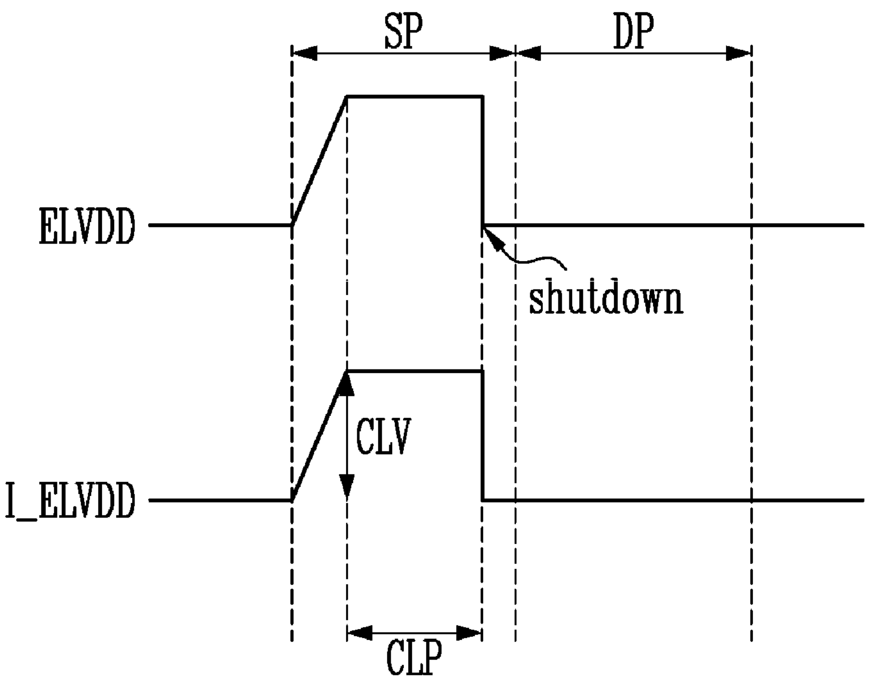
FIG. 7 is a diagram for describing an operation of an overcurrent protection circuit according to one embodiment of the present inventive concept.

FIG. 7 is a diagram for describing an operation of an overcurrent protection circuit according to one embodiment of the present inventive concept. In FIG. 7, it is assumed that burnt occurs as a driving current I_ELVDD flowing in a pixel unit 10 increases during a sensing period SP due to a manufacturing process variation, the generation foreign materials, and the like.

Referring to FIG. 6, an overcurrent protection circuit 71 according to one embodiment of the present inventive concept may be operated in a sensing mode and may include a current detector 711 and a current limiter 712.

The current detector 711 may generate a driving current value by detecting a driving current I_ELVDD2 flowing in a driving transistor included in each pixel PXij. As described above, in the sensing mode, the driving current I_ELVDD2 based on a second power voltage ELVDD2 supplied from a second power voltage generator 70 may flow in the driving transistor. The current detector 711 may supply the driving current value to the current limiter 712.

The current limiter 712 may determine whether to limit a current by comparing the driving current value supplied from the current detector 711 with a current limit value CLV.

The current limit value CLV may be a setting value for suppressing the occurrence of burnt due to an overcurrent and may be controlled by a timing controller 20 using $I^2C$ communication. In addition, the current limit value CLV may be set to several tens to hundreds of milliamperes and may be subjected to analog-to-digital conversion and stored in the current limiter 712.

Referring to FIGS. 6 and 7, when the driving current value is less than the current limit value CLV, the current limiter 712 may not limit a driving current I_ELVDD. This is because, when the driving current value is less than the current limit value CLV, the occurrence of burnt is insignificant, and thus an effect of the over current on a display device is not significant.

On the other hand, when the driving current value is greater than or equal to the current limit value CLV, the current limiter 712 may limit the driving current I_ELVDD to the current limit value CLV during a current limit period CLP. This is because, when the driving current value is greater than or equal to the current limit value CLV, burnt occurs, and thus an effect of the over current on the display device is significant.

The current limit period CLP may be an operation time of the overcurrent protection circuit and may be controlled by the timing controller 20 using $I^2C$ communication. For example, the current limit period CLP may correspond to a period in which a threshold voltage Vth of the driving transistor is sensed and/or a period in which mobility of the driving transistor is sensed. Accordingly, the occurrence of burnt is suppressed in the sensing period SP, thereby improving sensing accuracy and compensating power with respect to the threshold voltage Vth and/or the mobility of the driving transistor. In addition, the current limit period CLP may be subjected to analog-digital conversion and stored in the current limiter 712.

Referring to FIGS. 6 and 7, after the current limit period CLP, the current limiter 712 may supply an off signal OS to the timing controller 20. The off signal OS refers to a signal for shutting down the operation of a pixel unit 10. The timing controller 20 may supply a third control signal CS3 to each of the first power voltage generators 60 and 60' and the second power voltage generator 70 in response to the off signal OS, and each of the first power voltage generators 60 and 60' and the second power voltage generator 70 may be turned off in response to the third control signal CS3. Accordingly, the supply of a high potential power voltage ELVDD to the pixel unit 10 may be stopped after the current limit period CLP. That is, after the current limit period CLP, a voltage level of the high potential power voltage ELVDD may be zero.

In one embodiment, the overcurrent protection circuit 71 may further include a filter unit (not shown) that stops the operation of the current limiter 712 when the driving current I_ELVDD spikes. A case in which the driving current I_ELVDD spikes may refer to a case in which the driving current I_ELVDD increases rapidly in a very short time and then returns, and may mean a phenomenon in which the driving current I_ELVDD instantaneously jumps. That is, when the driving current I_ELVDD spikes, the filter unit (not shown) may stop the operation of the current limiter 712 to prevent malfunction of the overcurrent protection circuit 71.

According to embodiments of the present inventive concept, it is possible to improve stability and quality of an external compensation method and suppress a burnt phenomenon.

However, the effects of the present inventive concept are not limited to the above-described effects and may be variously expanded without departing from the spirit and scope of the present inventive concept.

Although the present inventive concept has been specifically described according to the above-described embodiments, it should be noted that the above-described embodiments are for illustrating the present inventive concept and not for limiting the scope of the present inventive concept. Those of ordinary skill in the art to which the present inventive concept pertains will understand that various modifications are possible within the scope of the technical spirit of the present inventive concept.

The scope of the present inventive concept should not be limited to the contents described in the detailed description of the specification but should be defined by the claims. It shall be understood that all modifications and variations conceived from the meaning and scope of the claims and their equivalents are included in the scope of the present inventive concept.

What is claimed is:

1. A display device comprising:

a pixel unit including pixels;

a sensing unit connected to the pixels through sensing lines;

a first power voltage generator connected to the pixels through a first power line and generating a first power voltage for driving the pixels;

a second power voltage generator connected to the pixels through the first power line and generating a second power voltage for sensing the pixels;

a timing controller selectively controlling operations of the first power voltage generator and the second power voltage generator according to a driving method of the pixel unit; and an overcurrent protection unit preventing an overcurrent from flowing in the pixel unit during a sensing period, wherein each of the pixels comprises a sensing transistor connected to one of the sensing lines and to a light emitting diode.

2. The display device of claim 1, wherein, when the pixel unit is driven in a display mode, the timing controller supplies a first control signal to the first power voltage generator, and the first power voltage generator supplies the first power voltage to the first power line in response to the first control signal.

3. The display device of claim 1, wherein, when the pixel unit is driven in a sensing mode, the timing controller supplies a second control signal to the second power voltage generator, and the second power voltage generator supplies the second power voltage to the first power line in response to the second control signal.

4. A display device comprising:

a pixel unit including pixels;

a sensing unit connected to the pixels through sensing lines;

a first power voltage generator connected to the pixels through a first power line and generating a first power voltage for driving the pixels;

a second power voltage generator connected to the pixels through the first power line and generating a second power voltage for sensing the pixels; and a timing controller selectively controlling operations of the first power voltage generator and the second power voltage generator according to a driving method of the pixel unit, wherein, when the pixel unit is driven in a sensing mode, the timing controller supplies a second control signal to the second power voltage generator, and the second power voltage generator supplies the second power voltage to the first power line in response to the second control signal, wherein the second power voltage generator further includes an overcurrent protection circuit operated in the sensing mode, and wherein the overcurrent protection circuit includes a current detector detecting a driving current flowing through a driving transistor included in each of the pixels to generate a driving current value, and a current limiter limiting the driving current to the current limit value during a current limit period when the driving current value is greater than or equal to a current limit value.

5. The display device of claim 4, wherein:

after the current limit period, the current limiter supplies an off signal to the timing controller;

the timing controller supplies a third control signal to each of the first power voltage generator and the second power voltage generator in response to the off signal; and each of the first power voltage generator and the second power voltage generator is turned off in response to the third control signal.

6. The display device of claim 4, wherein the current limit period corresponds to a period for sensing a threshold voltage of the driving transistor and/or a period for sensing mobility of the driving transistor.

7. The display device of claim 4, wherein the overcurrent protection circuit further includes a filter unit stopping an operation of the current limiter when the driving current spikes.

8. The display device of claim 4, wherein the timing controller controls the second power voltage, the current limit value, and/or the current limit period using inter integrated circuit ($I^2C$) communication.

9. The display device of claim 1, wherein a magnitude of a ripple voltage included in the second power voltage is less than a magnitude of a ripple voltage included in the first power voltage.

10. The display device of claim 1, further comprising an input voltage generator supplying an input voltage to the first power voltage generator, wherein the first power voltage generator converts the input voltage to supply the first power voltage.

11. The display device of claim 1, wherein the first power voltage is the same as or similar to an input voltage.

12. A method of driving a display device including a pixel unit which includes pixels, the method comprising:

generating a first power voltage for driving the pixels;

generating a second power voltage for sensing the pixels;

selectively supplying the first power voltage and the second power voltage to a first power line connected to the pixels according to a driving method of the pixel unit; and preventing an overcurrent from flowing in the pixel unit by limiting a driving current to a current limit value during a sensing period, wherein each of the pixels comprises a sensing transistor connected to a sensing line and to a light emitting diode.

13. The method of claim 12, further comprising, when the pixel unit is driven in a display mode, supplying the first power voltage to the first power line.

14. The method of claim 12, further comprising, when the pixel unit is driven in a sensing mode, supplying the second power voltage to the first power line.

15. The method of claim 14, further comprising:

detecting a driving current flowing in a driving transistor included in each of the pixels; and when the driving current is greater than or equal to the current limit value, limiting the driving current to the current limit value during a current limit period.

16. The method of claim 15, further comprising stopping supply of the first power voltage and the second power voltage after the current limit period.

17. The method of claim 15, wherein the current limit period corresponds to a period for sensing a threshold voltage of the driving transistor and/or a period for sensing mobility of the driving transistor.

18. The method of claim 15, further comprising, when the driving current spikes, stopping the limiting of the driving current to the current limit value.

19. The method of claim 15, wherein the second power voltage, the current limit value, and/or the current limit period are controlled through inter integrated circuit ($I^2C$) communication.

20. The method of claim 12, wherein a ripple magnitude of the second power voltage is less than a ripple magnitude of the first power voltage.

* * * * *